United States Patent [19]

Nillesen

[11] Patent Number: 4,488,170

[45] Date of Patent: Dec. 11, 1984

[54] SYNCHRONIZING CIRCUIT FOR A TELEVISION RECEIVER

[75] Inventor: Antonius H. H. J. Nillesen, Eindhoven, Netherlands

[73] Assignee: U.S. Philips Corporation, New York, N.Y.

[21] Appl. No.: 397,391

[22] Filed: Jul. 12, 1982

[30] Foreign Application Priority Data

Jul. 21, 1981 [NL] Netherlands ............... 8103437

[51] Int. Cl.³ ............... H04N 9/49; H04N 5/12; H04N 5/04
[52] U.S. Cl. ............... 358/26; 358/158; 358/148
[58] Field of Search ............... 358/149, 150, 26, 158, 358/19, 148

[56] References Cited
U.S. PATENT DOCUMENTS 3,904,823  9/1975  Van Straaten ............... 358/158
4,025,951  5/1977  Eckenbrecht ............... 358/158
4,351,002  9/1982  Decraemer ............... 358/158

Primary Examiner—John C. Martin
Assistant Examiner—Victor R. Kostak
Attorney, Agent, or Firm—Thomas A. Briody; William J. Streeter

[57] ABSTRACT

A synchronizing circuit arrangement for a television receiver having an oscillator which generates a clock signal the frequency of which is substantially higher than the line frequency and having a frequency dividing circuit which derives signals of the line frequency from the clock frequency by means of division. During a predetermined number of line periods a phase comparison stage determines the average value of the phase deviation between the received line synchronizing signal and a reference signal of the line frequency and applies the value obtained to a preset stage for adjusting in a subsequent time interval, for example one line period during the field blanking interval, the divisor by which the frequency dividing circuit divides the clock frequency. The clock frequency may be a multiple of the chrominance subcarrier frequency, in which case the oscillator is continuously readjusted by the phase comparison stage when the color killer circuit is operative, while the divisor is not changed.

11 Claims, 2 Drawing Figures

SYNCHRONIZING CIRCUIT FOR A TELEVISION RECEIVER

The invention relates to a synchronizing circuit for a television receiver, comprising a synchronizing pulse separating stage for deriving line and field synchronizing pulses from a received television signal, an oscillator for generating by means of a crystal a periodical clock signal the frequency of which is substantially higher than the line frequency, a frequency divider circuit connected to the oscillator for deriving a signal of the line frequency by dividing the clock frequency by a divisor, and a phase comparison stage for determining the phase deviation between the received line synchronizing pulses and a locally generated reference signal of the line frequency.

Such a circuit is known from the publication "IEEE Transactions on Consumer Electronics", Vol. CE-24, No. 3, pages 284 to 290, inclusive, published in August 1978. In this prior art circuit the clock frequency is nominally 32 times the line frequency. The crystal oscillator is a voltage-controlled oscillator which is continuously readjusted by the output voltage of the phase comparison stage which determines the phase deviation between the line synchronizing pulses and the line flyback pulses originating from a line output stage. The frequency of the oscillator output signal is divided by a constant divisor, namely 32, in order to obtain the drive signal for the (horizontal) line deflection, and by a second divisor to obtain the drive signal for the (vertical) field deflection, which second divisor depends on the state of the loop for the field synchronization and is continuously readjusted. From the foregoing it appears that both the frequency of the line drive signal and the frequency of the field drive signal are continuously readjusted and that consequently these two frequencies may vary at any instant. As regards the line frequency, the result of such a variation is that the length of the horizontal lines written on the picture screen of the picture display tube varies, so that distortion of the displayed picture may occur. When the received television signal contains much noise and many interferences, picture distortion will occur very often.

SUMMARY OF THE INVENTION

The invention has for its object to provide a synchronizing circuit, wherein the generated line frequency is not changed immediately on detection of a phase error. For that purpose the synchronizing circuit in accordance with the invention includes a phase comparison stage implemented for establishing during a predetermined number of line periods the average value of the phase deviation between the input signals applied to it, and for supplying the value obtained to a preset stage for adjusting in a time interval subsequent thereto the divisor by which the frequency dividing circuit divides the clock frequency.

The invention is based on the fact that if the chosen number of line periods for which the average phase variation is established is large enough, the average value obtained for a larger number of line periods will hardly deviate therefrom as the phase deviations caused by noise and interferences have an average value which is usually substantially equal to zero. In accordance with the invention, the frequency of the clock oscillator is not controlled but, after an average phase error has been detected, the divisor is changed in one single operation.

The circuit in accordance with the invention adjusts the divisor by changing the duration of a line period. Preferably, the time interval in which adjustment of the divisor is effected is one line period during the field blanking interval.

If the circuit is provided with digital means, then it may advantageously include a phase comparison stage with a counter for counting clock periods between the instant of occurrence of a line synchronizing pulse and the instant of occurrence of a reference pulse, and the counter may be an up-down counter which is enabled by one of the pulses applied to the phase comparison stage.

In one embodiment the circuit in accordance with the invention, in the event a phase deviation between the input signals applied to the phase comparison stage, exceeds a predetermined maximum value, the phase comparison stage applies this maximum value to the preset stage during the next line period. This reduces the pull-in period considerably in the event of a large phase deviation.

If the synchronizing circuit in accordance with the invention is used in a color television receiver which receiver includes a color killer circuit which operates when an insufficient color synchronizing signal is received, then the frequency of the clock signal may be a multiple of the color subcarrier frequency in the color television standard for which the receiver is suitable.

In that case the circuit may have a change-over switch which is controlled by the color killer circuit, and by a second phase comparison stage for establishing the phase deviation between the received line synchronizing signal and a signal derived from the clock signal by means of division and which continuously controls the oscillator when the color killer circuit is operative, and also by a change-over switch controlled by the color killer circuit. The phase comparison stage continuously readjusts the oscillator as a function of the phase deviation established in each line period when the color killer circuit is operative, the preset stage having then no influence on the divisor by which the frequency divisor circuit divides the clock frequency.

The invention will now be described in greater detail by way of example with reference to the accompanying Figures

DESCRIPTION OF THE PREFERRED EMBODIMENTS

Figure 1:
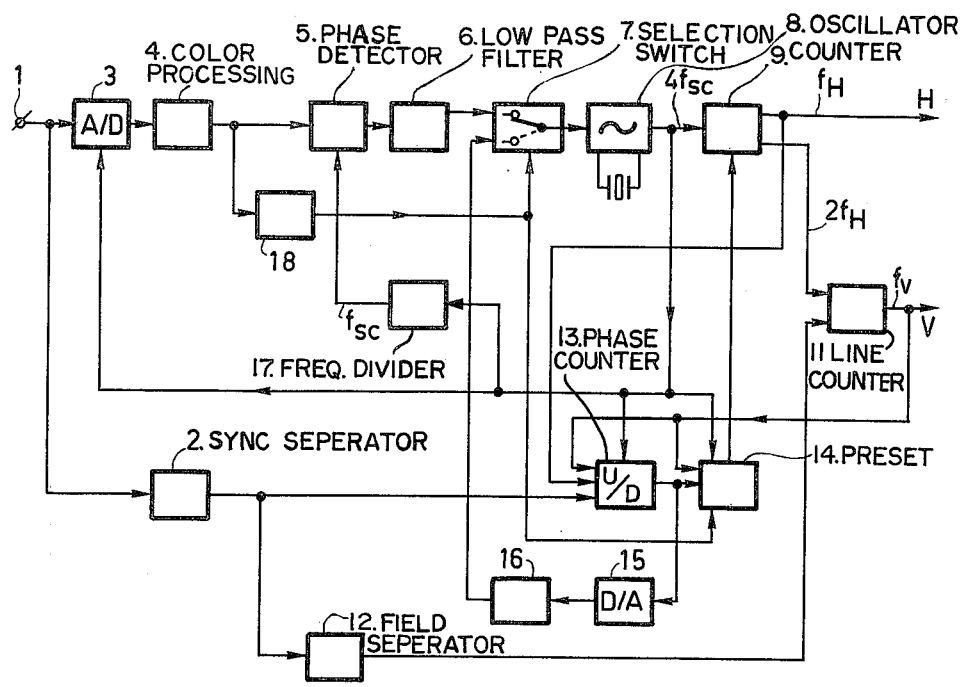
FIG. 1 shows a block schematic circuit diagram of a circuit in accordance with the invention.

In FIG. 1 reference numeral 1 denotes the input terminal of the circuit. A video signal which is received and processed in known manner, is present on this input terminal. Said signal comprises video information which, in stages not shown, is further processed for use in a picture tube, and a composite synchronizing signal. The signal on terminal 1 is applied to a synchronizing-separating stage 2 at the output of which the said synchronizing signal is available, and to an analog-to-digital converter 3. The resultant digital video signal is applied to a processing stage 4 which applies a digital color synchronizing signal to a phase detector 5. The output signal thereof is smoothed by means of a low-pass filter 6. Via a selection switch 7, the smoothed signal is applied to a quartz crystal-stabilized oscillator 8 for readjusting the frequency and/or the phase thereof.

Oscillator 8 generates the sampling signal for the video signal and is applied for that purpose to converter 3. The value 17.72 MHz i.e. four times the color subcarrier frequency fsc, which is approximately equal to 4.43 MHz (PAL-standard) is taken as the frequency of said signal. The frequency of the signal generated by oscillator 8 is divided by four by means of a frequency dividing circuit 17 and the resultant signal is applied to phase detector 5, in which the phase difference between the two input signals thereof is converted into a voltage which controls oscillator 8. As the color synchronizing signal supplied by stage 4 has the frequency of the subcarrier, the signal received from circuit 17 gets substantially the same frequency and phase as the subcarrier with the aid of the control loop formed by the elements 5, 6, 8 and 17 and may consequently be applied to chrominance demodulators, not shown, for generating color signals.

The sampling signal generated by oscillator 8 may be used in different places in the television receiver of which the circuit of FIG. 1 is part. As the phase of said sampling signal is locked to the color synchronizing signal and consequently to the line and field synchronizing signals supplied by the transmitter, it can be used to control comb filters with digital delay lines for separating the chrominance signal from the video signal and also for noise reduction circuits. A condition to be satisfied is that the phase deviation between the transmitter line signal and a locally generated line signal does not substantially vary during a field period, not even in the event of a poor signal-to-noise ratio, and preferably this variation also does not occur between consecutive fields. The phase is kept substantially constant by means of the circuit shown in FIG. 1, but not by controlling oscillator 8 but by a setting of the stages which will now be further described. It will be obvious that a constant phase relationship is also important when the above-mentioned delay lines are not used, in order to obtain good line synchronization and consequently to prevent distortion of the displayed signal.

The signal generated by oscillator 8 is applied as a clock signal to a counter 9 which derives therefrom in known manner a signal of the line frequency in accordance with the formula for the PAL-subcarrier wave frequency $f_{SC}$:

$$f_{SC} = \left( \frac{1135}{4} + \frac{1}{625} \right) f_H.$$

wherein $f_H$ is the line frequency. The resultant signal of the line frequency is inter alia used as a drive signal for a line deflection circuit H, not shown, for deflecting in the horizontal direction the electron beam(s) generated in the picture tube. In addition, PAL-counter 9 applies a signal of twice the line frequency $2f_H$ to a line counter 11.

The field synchronizing signal is derived from the composite synchronizing signal from stage 2 by means of a field synchronizing-separating stage 12. The resultant signal is applied to line counter 11. Counter 11 derives a signal $f_V$ of the field frequency from the signal $2f_H$, which signal of the field frequency is used inter alia as a control signal for a field deflection circuit V, not shown, for deflecting the electron beam(s) in the vertical direction. With respect to the received field synchronizing signal said signal $f_V$ has the proper phase because of the fact that counter 11 comprises means for determining and correcting, in known manner, the phase of the signal generated thereby.

In order to give the drive signal of the line frequency the proper phase with respect to the received line synchronizing signal, the circuit of FIG. 1 comprises a phase counter 13 and a preset stage 14. Phase counter 13 is supplied with the line synchronizing signal produced by stage 2 and the clock signal generated by oscillator 8, or a signal derived therefrom, for example the signal supplied by circuit 17, and is enabled by the signal of the line frequency produced by PAL-counter 9. In these circumstances, counter 13, which is an up-down counter, counts up the number of clock pulses occurring between the starting moment of an enabling pulse, and an edge of the line synchronizing signal. Thereafter the number of clock pulses which occur between the said edge and the final instant of the enabling pulse is counted down. So the counting position after the enable interval is for a determined line period a measure of the phase deviation between the signal produced by PAL-counter 9 and the received line synchronizing signal. The resultant counting position is stored until the occurrence of the next enabling pulse, at the occurrence whereof the counting operation is continued. After a given number of line periods and counting position of counter 13 is a measure of the sum of the phase deviations which occurred during said line periods. By dividing this counting position by the number of lines a number is obtained which corresponds to the average value of the phase deviation during these lines.

As the incoming line synchronizing signal is beset with noise and interferences, the sign and the value of the phase deviation between a line synchronizing pulse and a locally generated reference pulse of the line frequency cannot be predicted with certainty for a given line period. The same applies to a small number of line periods. However, considered over a large number of line periods the average value of the phase deviation caused by noise and interferences usually becomes substantially zero. This number of line periods must then be sufficiently large to ensure that the average value obtained for a larger number of line periods does not deviate to an appreciable extent from the first-mentioned value. So if the average value of the phase deviation over such a large number of line periods is determined, then a value is obtained which depends with a fairly large degree of certainty on the mutual phase position of the two signals of the line frequency applied to counter 13.

Figure 2:
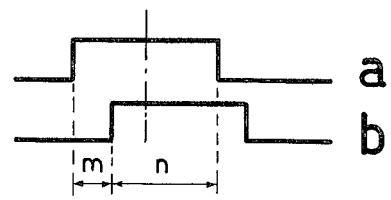
FIG. 2 shows schematically two waveforms occurring in the circuit of FIG. 1.

Half of the average value obtained is applied to preset stage 14 by phase counter 13. In a subsequent time interval this information is converted into information which is usable for PAL-counter 9, so that counter 9 gets an initial value. As a result thereof, during the said interval, the duration of one period, i.e. approximately 64 $\mu$s of the signal of the line frequency supplied by counter 9 is prolonged or reduced by, for example, not more than 2 $\mu$s. If the phase error measured, expressed in units of time, is less than 2 $\mu$s, then this correction which occurs only once is sufficient to obtain the proper phase for the signal supplied by counter 9. This can be verified by means of FIG. 2. In this Figure a represents an enabling pulse supplied by counter 9 for phase counter 13, while b represents a line synchronizing pulse applied thereto. By means of counter 13 m clock periods are counted up between the leading edges of pulses a and b and n clock periods are counted down between the leading edge of signal b and the trailing edge of signal a. For the relevant line, counter 13 has counted down a total of n−m. If the edge of pulse b is produced in the middle of pulse a, then the counting position for this line is zero. From FIG. 2 it appears that the phase deviation of signal b with respect to this middle instant of time can be corrected for by shifting the leading edge of signal b to the right by (n−m/2) clock periods, that is half the counting position obtained for this line.

Once the correction has been effected the phase difference between the incoming signal and the reference signal is zero. Only very serious interference occurring in a subsequent measuring interval is capable of producing a phase difference which differs from zero, resulting in a phase error for the duration of the measuring interval following thereafter. It will be obvious that said error will be very small if the duration of the measuring interval is rather long. However, too long a duration has the disadvantage that the phase error becomes visible before the correction is realized. It has been found that a measuring interval of the length of one field period is a good compromise, which has the additional advantage that the correction may then occur during a line period of the field blanking interval following thereafter, that is to say the correction is invisible. In this manner the phase will be incorrect for not more than one field period, i.e. 20 ms for the European standard. Preset stage 14 and counter 13 are also supplied with the signal of the field frequency supplied by counter 11 and stage 14 passes the required correction on to counter 9 during a determined line period of the field blanking interval.

In accordance with the foregoing the measuring interval has a duration of one field period, i.e. approximately 312 line periods. It has been found that 256 is large enough, that is to say that the average value obtained after 256 line periods would change very little between the 256$^{th}$ and the 312$^{th}$ period. 256 has the advantage that the division thereby can be effected with digital means in a simple manner, namely by shifting the counting position of counter 13 over 8 bit positions, while a division by 2 is obtained by one further shift.

In FIG. 1 the signal produced by counter 9 is used as a reference signal for the phase comparison by means of the phase counter 13. It will be obvious that alternatively line flyback pulses present in the line deflection circuit may be used for this purpose. Also in the case of FIG. 1 a second correction loop may be arranged in known manner between line counter 11 and the line deflection circuit, in which loop the line flyback signal is again used as a reference signal. In both cases outlined above the influence of turn-off periods of unequal durations of a switch in the circuit is substantially eliminated.

If the received television signal is a non-standard signal, to the effect that the frequency of the chrominance carrier and/or the frequency of the line synchronizing signal does not have the prescribed value, but is however constant, then the circuit of FIG. 1 will still be capable of generating a line signal which is usable. If such a television signal which may, for example, be received from a television game circuit, then during one field period the phase of the reference signal continuously shifts with respect to the received signal, the reason being that PAL-counter 9 then uses an incorrect divisor. The horizontal lines are shown somewhat shifted with respect to the first lines which are substantially free of phase error because of the correction occurring before the beginning of the field. So the picture is displayed obliquely, either to the left or to the right. Since, however, a deviation of half a period of the subcarrier wave corresponds to approximately 113 ns and since 100 ns corresponds to approximately 1 mm on a 50 cm—wide picture screen, it will be obvious that such an obliqueness in the display is visible to a very small extent only.

In the preceding it is mentioned that an error of not more than 2 μs can be corrected by one non-recurrent correction. In the case of larger errors, for example at a change of transmitters, it will not be possible to correct the error in one single operation. As the largest possible error with a line period of 64 μs is 32 μs, the correction will last for a maximum of 16 fields, which is very long. This can be avoided when the phase deviation is not only measured during the "window" a of FIG. 2 but during the entire line period. A different possibility is that after counter 13 has detected an error which exceeds a predetermined value, for example 2 μs, the setting value of PAL-counter 9 is not corrected after one field, but is corrected continuously, that is to say each line, by 2 μs. In these circumstances pull-in has a duration of not more than 16 line periods, whereafter the measured error is less than 2 μs, so that averaging the error is effected, as in the foregoing, over 256 line periods.

If the color synchronizing signal is very weak, for example because the received television signal contains very much noise, or is even absent completely, for example with a black-white transmission, the oscillator 8 cannot be readjusted in the above-described manner. In that case a color killing circuit 18 connected to the output of processing stage 4 is made operative in known manner for cutting-off the chrominance portion of the receiver. The signal supplied by circuit 18 is also applied to selection switch 7 and to preset stage 14. By means of a digital-to-analog converter 15, the output signal of phase counter 13 is converted into a voltage which for every line is a measure of the phase deviation detected by counter 13. By means of a second filter 16 said voltage is smoothed and the smoothed voltage is applied to oscillator 8 for the purpose of readjusting it. To this end selection switch 7 is then maintained in the appropriate position by means of circuit 18, filter 6 not being connected to oscillator 8 while filter 16 is connected thereto, circuit 18 also keeping stage 14 in the inoperative state, so that the divisor cannot be changed. In these circumstances oscillator 8 is continuously adjusted for maintaining the phase difference between the line synchronizing pulses and the reference pulses at substantially zero value. For that purpose elements 8, 9, 13, 15 and 16 are part of a phase control loop and elements 13 and 15 behave as a phase detector. As also in this case counter 9 keeps dividing the frequency of oscillator 8 in accordance with the PAL-formula, the sampling frequency remains coupled to the incoming line signal in the desired manner, so that the digital delay lines used in the chrominance portion for noise reduction realize the proper time delays.

A circuit arrangement which is suitable for the PAL-standard is described in the foregoing. It will be obvious that the arrangement, provided it is somewhat modified, may alternatively be used for other color television standards. In the foregoing the clock frequency was given the value $4f_{SC}$: it will be obvious that multiples other than 4 are also suitable. Since the television receiver of which the circuit of FIG. 1 forms part comprises comb filters, a multiple of frequency $f_{SC}$ has advantages, but it will be clear that these advantages are not associated with the present synchronizing circuit, so that preference may be given to a clock frequency which is not coupled to frequency $f_{SC}$. A higher frequency may then be chosen, so that the clock pulses have a shorter duration, which is advantageous for detecting small phase deviations.

Finally, it should be noted that some digital stages in the circuit of FIG. 1 may be replaced in known manner by analog stages. The average value of the phase deviation, for example, can be determined by means of an integrator, while the phase deviation itself can be measured with a phase discriminator of a known type.

What is claimed is:

1. A synchronizing circuit for a television receiver comprising:

a synchronizing-separating stage for deriving line and field synchronizing pulses from a received television signal, a crystal controlled oscillator for generating a periodic clock signal, the frequency of which is substantially higher than the line frequency of said television signal, a frequency divider circuit connected to the oscillator for deriving a deflection drive signal for a line deflection circuit at the line frequency by dividing the clock frequency by a divisor, and a phase comparison stage for determining the phase deviation between the received line synchronizing pulses and a locally generated reference signal having the line frequency, the phase comparison stage establishing during a predetermined number of line periods the average value of the phase deviation between the signals applied to it, and for supplying the value obtained to a preset stage for adjusting in a time interval subsequent thereto the divisor of the frequency dividing circuit.

2. A circuit of claim 1, wherein the adjustment of the divisor is effected by changing the duration of a line period.

3. A circuit according to claim 1 or 2, wherein the time interval in which adjustment of the divisor is effected is one line period during the field blanking interval.

4. A circuit according to claim 3, wherein the number of line periods in which the average value of the phase deviation is established is 256.

5. A circuit according to claim 1, wherein the phase comparison stage includes a counter for counting clock periods between the instant of occurrence of a line synchronizing pulse and the instant of occurrence of a reference pulse.

6. A circuit according to claim 5, wherein the counter is an up-down counter which is enabled by one of the pulses applied to the phase comparison stage.

7. A circuit according to claim 1, wherein the phase comparison stage establishes the phase deviation defined by an edge of a received line synchronizing pulse and the time corresponding to the middle of a reference pulse, said stage applying half of the average phase deviation obtained during said number of line periods to the preset stage.

8. A circuit according to claim 1, whereby in the event of a phase deviation between the input signals applied to the phase comparison stage which exceeds a predetermined maximum value, the phase comparison stage applies this maximum value to the preset stage during the next line period.

9. A circuit as claimed in claim 1 for use in a color television receiver which comprises a color killer circuit which is operative when an insufficient color synchronizing signal level is received, and the frequency of the clock signal is a multiple of the color subcarrier frequency of the color television standard of the receiver.

10. A circuit according to claim 9, further comprising a change-over switch which is controlled by the color killer circuit, and comprising a second phase comparison stage for establishing the phase deviation between the received line synchronizing signal and a signal which is derived from the clock signal by means of dividing, said second phase comparison stage continuously controlling the oscillator when the color killer circuit is operative.

11. A circuit as claimed in claim 9, further comprising a change-over switch controlled by the color killer circuit, for connecting the phase comparison stage to continuously readjust the oscillator as a function of the phase deviation established in each line period, when the color killer circuit is operative, and to inhibit the preset stage from influencing the divisor of the dividing circuit which divides the clock frequency.

* * * * *